O. COOLEY.
PITMAN.
No. 191,116.
Patented May 22, 1877.
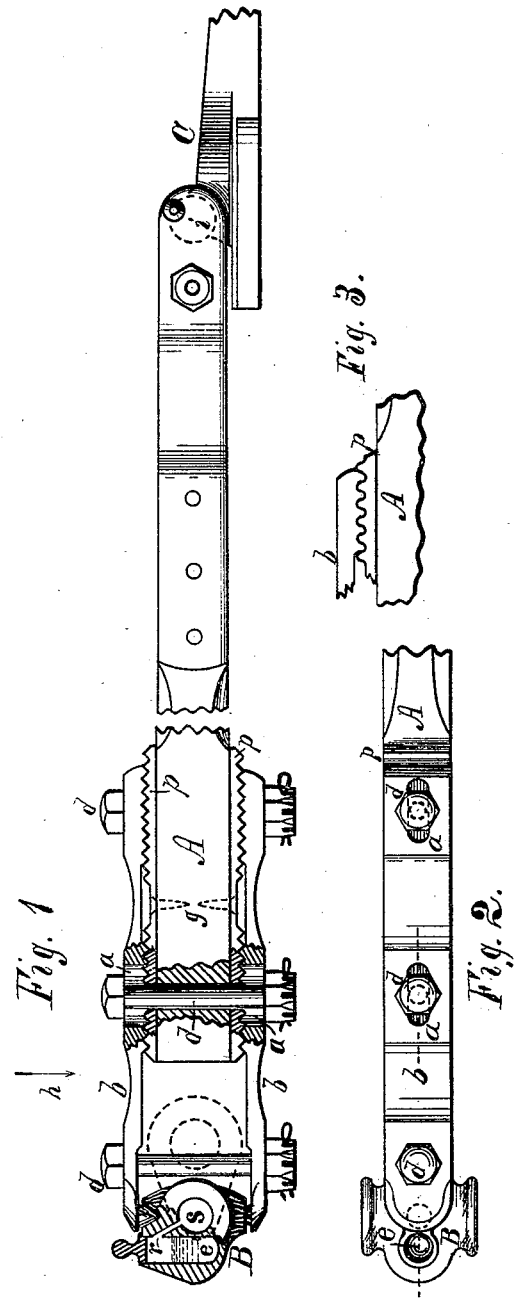
Attest:
Louis C. Cook.
John C. Burns.
Inventor:
Orville Cooley,
by E. B. Whitmore, Atty.

UNITED STATES PATENT OFFICE.

ORVILLE COOLEY, OF BROCKPORT, N. Y., ASSIGNOR TO THE JOHNSTON HARVESTER COMPANY, OF SAME PLACE.

IMPROVEMENT IN PITMEN.

Specification forming part of Letters Patent No. 191,116, dated May 22, 1877; application filed January 15, 1877.

*To all whom it may concern:*

Be it known that I, ORVILLE COOLEY, of Brockport, in the county of Monroe and State of New York, have invented a new and useful Improvement in Harvester-Pitmen, which improvement is fully set forth in the following specification and accompanying drawing, in which—

Figure 1 is a side elevation of my improved pitman; Fig. 2, a plan of the head portion of the same, looking in the direction of the arrow *h;* and Fig. 3 a modification of the corrugations, hereinafter explained.

The object of my invention is to furnish a device by means of which the pitman of a harvester may be conveniently varied in length for the purpose of adjusting the knives of the sickle-bar to the guards.

In the drawing, A is the body or wood portion of the pitman, upon two opposite sides of which, near the head end, are arranged the notched or corrugated plates *p*. The straps *b*, which hold the box B, are similarly corrugated upon their inner sufaces, and when placed face to face with the plates, as shown in Fig. 1, the teeth or corrugations of the two mutually interlock, and the bolts *d* hold the said plates and straps together and to the pitman-body A.

The straps are provided with the slots *a*, which permit of their being moved endwise, and to lengthen or shorten the pitman—that is, the distance between the bearings *s* and *i*, for the purpose of adjusting the knives to the guards—it is only necessary to loosen the bolts *d*, and move the straps equally forward or back one or more notches, as the case may require. This affords an easy and reliable method for adjusting the knives, and when the bolts *d* are tightened the pitman is rigid as to length.

The plates *p* are not designed to be moved upon the timber, but may be fastened thereto by screws *g*, or other convenient means, besides fitting closely to the bolts *d*, which pass through them.

A box, B, for the crank-pin is hung between two opposing conical points of the straps, and is provided with an oil-reservoir, *e*, closed by a screw-cap. A small duct, *r*, connects the upper portion of the reservoir with the bearing *s*, and below this outlet there is a liberal space for holding the oil, which is prevented from escaping while the machine is at rest. When running, the violent motion of the crank dashes the oil about within the chamber, causing it to flow sparingly down upon the bearing *s* to lubricate the same.

The corrugations in the plates *p* and the straps for a full-sized pitman I design to make about one-eighth of an inch in width, which permits of a very close adjustment of the knives.

These notches or furrows may be made angular, as shown in Fig. 1, or ogee in form of cross-section, as shown in Fig. 3, or some other suitable form, though I prefer the angular form, as shown.

It may be desirable to dispense with the plates *p*, and let the furrowed surfaces of the straps press directly upon the timber, which, it is believed, would hold sufficiently strong, as the sharp edges would be forced into the grain of the wood, and the adjustment in the length of the pitman could be made with equal facility, as above described.

I am aware that it is old to provide a pitman with an oil chamber or reservoir communicating at its bottom with the crank or wrist bearing; but, in practice, such arrangement is found to be objectionable, for the reasons that the flow of oil cannot be controlled, and that the oil escapes and is wasted when the pitman is not in action, unless the reservoir is filled with absorbent material, in which case the supply of oil is necessarily limited, and the delivery of the same rendered imperfect.

The advantages of my arrangement, in which the oil-outlet is located at the top instead of the bottom of the reservoir, is that there can be no escape of the oil when the pitman is at rest, that the reservoir may receive a large supply of oil without using the objectionable absorbent material, and that, when the pitman is in action, the oil is delivered to the bearing with certainty and regularity.

I claim as my invention—

1. In a harvester-pitman, the corrugated or furrowed straps *b* and plates *p*, substantially as shown and described, and for the purpose set forth.

2. In an adjustable harvester pitman, the furrowed straps *b*, provided with the slots *a*, substantially as shown and described, and for the purpose set forth.

3. A pitman provided with an oil-chamber closed at its bottom, and communicating at or near its top with the crank or wrist bearing, substantially as shown, whereby the oil is prevented from escaping when the pitman is at rest, but caused to feed from the chamber to the bearing when the pitman is in action.

ORVILLE COOLEY.

Witnesses:
C. D. DEWEY,
E. B. WHITMORE.